United States Patent
Maekawa et al.

(10) Patent No.: US 12,237,506 B2
(45) Date of Patent: Feb. 25, 2025

(54) NON-AQUEOUS ELECTROLYTE SECONDARY BATTERY

(71) Applicant: SANYO Electric Co., Ltd., Daito (JP)

(72) Inventors: Masanori Maekawa, Osaka (JP); Takayuki Ishikawa, Osaka (JP); Kaoru Nagata, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 648 days.

(21) Appl. No.: 17/603,372

(22) PCT Filed: Apr. 15, 2020

(86) PCT No.: PCT/JP2020/016486
§ 371 (c)(1),
(2) Date: Oct. 13, 2021

(87) PCT Pub. No.: WO2020/213617
PCT Pub. Date: Oct. 22, 2020

(65) Prior Publication Data
US 2022/0216470 A1 Jul. 7, 2022

(30) Foreign Application Priority Data
Apr. 19, 2019 (JP) .................................. 2019-079975

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/364* (2013.01); *H01M 4/366* (2013.01); *H01M 4/62* (2013.01);
(Continued)

(58) Field of Classification Search
CPC ....... H01M 4/525; H01M 4/364; H01M 4/366; H01M 4/62; H01M 10/4235; H01M 2004/028; H01M 4/621; Y02E 60/10
See application file for complete search history.

(56) References Cited

U.S. PATENT DOCUMENTS

| 2015/0162599 A1 | 6/2015 | Takei et al. |
| 2017/0084916 A1 | 3/2017 | Oka et al. |

(Continued)

FOREIGN PATENT DOCUMENTS

| CN | 1238260 | * 5/2006 | ............ Y02E 60/10 |
| CN | 109075378 A | 12/2018 | |

(Continued)

OTHER PUBLICATIONS

International Search Report dated Jul. 7, 2020, issued in counterpart International Application No. PCT/JP2020/016486 (2 pages).

(Continued)

*Primary Examiner* — Helen Oi K Conley
(74) *Attorney, Agent, or Firm* — WHDA, LLP (57) ABSTRACT

In a non-aqueous electrolyte secondary battery that is one example of the embodiment, a positive electrode mix layer comprises a positive electrode active material comprising a lithium transition metal composite oxide represented by general formula: $Li_aNi_bCo_{(1-b-c)}Al_cO_d$ ($0.9 < a \leq 1.2$, $0.88 \leq b \leq 0.96$, $0.04 \leq c \leq 0.12$, $1.9 \leq d \leq 2.1$) and lithium carbonate in an amount of 0.1 to 1.0% by mass relative to the mass of the positive electrode active material. The lithium transition metal composite oxide has the form of secondary particles formed by the aggregation of primary particles, wherein tungsten is present, on the surface of each of the primary particles, in an amount of 0.05 to 0.20 mol % relative to the total molar amount of non-Li-metal elements contained in the positive electrode active material.

6 Claims, 1 Drawing Sheet

(51) Int. Cl.
   *H01M 4/36*   (2006.01)
   *H01M 4/62*   (2006.01)
   *H01M 10/42*  (2006.01)

(52) U.S. Cl.
   CPC .. *H01M 10/4235* (2013.01); *H01M 2004/028* (2013.01)

(56) References Cited

U.S. PATENT DOCUMENTS

| | | |
|---|---|---|
| 2019/0020023 A1 | 1/2019 | Yokoyama et al. |
| 2019/0044152 A1 | 2/2019 | Sakida et al. |
| 2020/0343547 A1 | 10/2020 | Yokoyama et al. |
| 2021/0135210 A1 | 5/2021 | Kawakita et al. |

FOREIGN PATENT DOCUMENTS

| | | | | |
|---|---|---|---|---|
| JP | H04328278 A | * | 4/1991 | ............. Y02E 60/10 |
| JP | 2005-108513 A | | 4/2005 | |
| JP | 2015-115105 A | | 6/2015 | |
| WO | 2015/141179 A1 | | 9/2015 | |
| WO | 2017/145849 A1 | | 8/2017 | |
| WO | 2018/142929 A1 | | 8/2018 | |
| WO | 2019/044338 A1 | | 3/2019 | |

OTHER PUBLICATIONS

English translation of Office Actoin dated Dec. 13, 2023, issued in counterpart CN Application No. 202080029164.0. (5 pages).
Extended (Supplementary) European Search Report dated May 25, 2022, issued in counterpart EP application No. 20790421.0. (8 pages).

* cited by examiner

NON-AQUEOUS ELECTROLYTE SECONDARY BATTERY

TECHNICAL FIELD

The present disclosure relates to a non-aqueous electrolyte secondary battery, and more particularly, relates to a non-aqueous electrolyte secondary battery including a lithium-transition metal composite oxide containing Ni, Co, and Al, as a positive electrode active material.

BACKGROUND ART

In recent years, a lithium-transition metal composite oxide having a high Ni content, which exhibits a large capacity even at a voltage of 4.2 V and contributes to increase in a battery capacity, has been known as a positive electrode active material for a non-aqueous electrolyte secondary battery. Patent Literature 1, for example, discloses a non-aqueous electrolyte secondary battery comprising a positive electrode including: a lithium-transition metal composite oxide having more than 90 mol % of a Ni content based on a total molar amount of metal elements excluding Li and a tungsten compound. As a specific example of the lithium-transition metal composite oxide, Patent Literature 1 describes a composite oxide represented by a general formula of $LiNi_{0.91}Co_{0.06}Al_{0.03}O_2$.

Patent Literature 2 discloses a non-aqueous electrolyte secondary battery comprising a positive electrode including: a lithium-transition metal composite oxide-represented by a general formula of $Li_xNi_yM_{(1-y)}O_2$ ($0<x\leq1.2$, $0.88\leq y\leq0.99$, and M is at least one element selected from the group consisting of Al, Co, Fe, Cu, Mg, Ti, Zr, Ce, and W); and lithium carbonate.

CITATION LIST

Patent Literature

PATENT LITERATURE 1: International publication No. 2015/141179
PATENT LITERATURE 2: International publication No. 2017/145849

SUMMARY

Technical Problem

However, a lithium-transition metal composite oxide having a high Ni content has an unstable crystalline structure, and thereby has problems such as being likely to cause cation mixing, which is transfer of Ni ions to Li ion sites. As a technique to solve these problems, increasing an amount of Al added to stabilize the crystalline structure can be generally possible. Such increase in the amount of Al added, hog ever, may cause to lower the capacity.

An object of the present disclosure is, in a non-aqueous electrolyte secondary battery including a lithium-transition metal composite oxide containing Ni, Co, and Al, as a positive electrode active material, to sustain a crystalline structure of the composite oxide for further increase in the battery capacity.

Solution to Problem

A non-aqueous electrolyte secondary battery of an aspect of the present disclosure comprises a positive electrode having a positive electrode Core and a positive electrode mixture layer provided on a surface of the positive electrode core, in which: the positive electrode mixture layer includes a positive electrode active material including a lithium-transition metal composite oxide represented by a general formula of $Li_aNi_bCo_{(1-b-c)}Al_cO_d$ ($0.9<a\leq1.2$, $0.88\leq b\leq0.96$, $0.04\leq c<0.12$, and $1.9\leq d\leq2.1$) and 0.1 to 1.0 mass % of lithium carbonate based on the mass of the positive electrode active material; the lithium-transition metal composite oxide is secondary particles formed by aggregation of primary particles; and 0.05 to 0.20 mol % of tungsten is present on a surface of the primary particles based on a total molar amount of metal elements excluding Li, in the positive electrode active material.

Advantageous Effect of Invention

According to an aspect of the present disclosure, a non-aqueous electrolyte secondary battery having a large capacity may be provided.

DESCRIPTION OF EMBODIMENTS

A lithium-transition metal composite oxide containing Ni, Co, and Al and having 88 mol % or more of a Ni content based on a total molar amount of metal elements excluding Li has attracted attention as a positive electrode active material for a large capacity. Such lithium-transition metal composite oxide, however, has an unstable crystalline structure, and thereby has problems such as being likely to cause cation Presence of tungsten (W) on a particle surface of the lithium-transition metal composite oxide is known to form a lithium compound by reacting a Li source remained near the surface and the W, resulting in improvement in battery performance such as cycle characteristics. Whereas, too much amount of the W added causes extracting Li ions also from inside of the particle to contribute to lower the capacity; thus, the effect by adding the W is not easily compatible with the large capacity.

The present inventors have found that addition of a predetermined amount of lithium carbonate to a positive electrode mixture layer, based OA a mass of a positive electrode active material including a lithium-transition metal composite oxide containing Ni, Co, and Al at a specific molar ratio and a predetermined amount of W that is present on a particle surface of the composite oxide, stabilizes the crystalline structure of the lithium-transition metal composite oxide to increase the battery capacity. The stabilization of the crystalline structure by adding Al as well as an interaction between the W that is present on the particle surface of the composite oxide and the lithium carbonate included in the positive electrode mixture layer specifically increase the battery capacity within a certain predetermined composition range.

Figure 1:
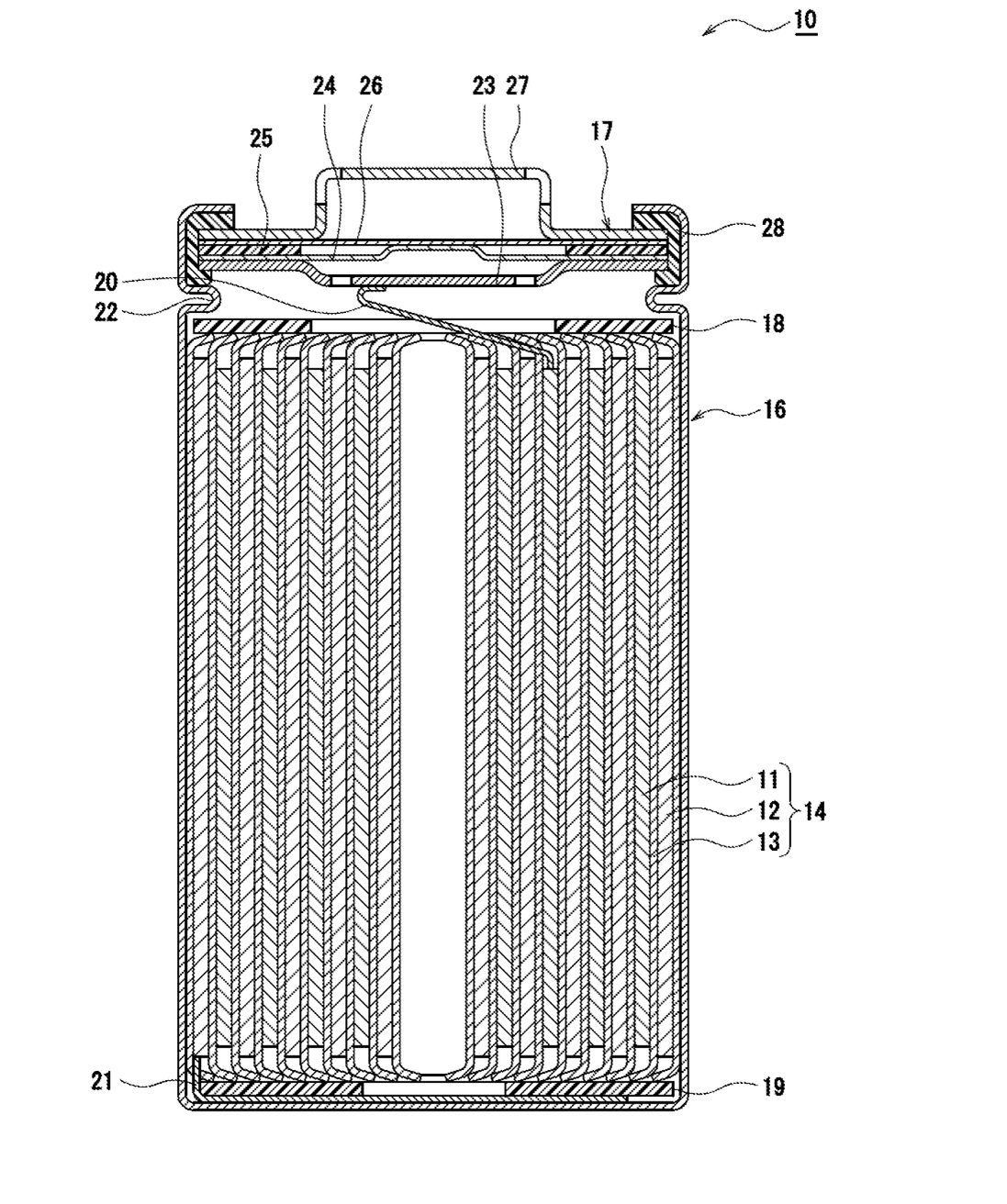
FIG. 1 is a sectional view of the non-aqueous electrolyte secondary battery of an example of an embodiment.

Hereinafter, an example of an embodiment of the non-aqueous electrolyte secondary battery according to the present disclosure will be described in detail. Hereinafter, a cylindrical battery in which a wound-type electrode assembly 14 is housed in a bottomed cylindrical exterior housing can 16 will be exemplified, but an exterior housing body is not limited to the cylindrical exterior housing can and may be, for example, a rectangular exterior housing can and may be an exterior housing body constituted with laminated sheets including a metal layer and a resin layer. The electrode assembly may be a flatly-formed wound-type electrode assembly and may be a stacked electrode assembly in which positive electrodes and negative electrodes are alternatively stacked with separators interposed therebetween.

FIG. 1 is a sectional view of a non-aqueous electrolyte secondary battery 10 of an example of an embodiment. As exemplified in FIG. 1, the non-aqueous electrolyte secondary battery 10 comprises the wound-type electrode assembly 14, a non-aqueous electrolyte (not illustrated), and the exterior housing can 16 housing the electrode assembly 14 and the non-aqueous electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metallic container having an opening at one side in an axial direction, and the opening of the exterior housing can 16 is sealed with a sealing assembly 17. Hereinafter, for convenience of description, a side of the sealing assembly 17 of the battery will be described as the upper side, and a side of the bottom of the exterior housing can 16 will be described as the lower side.

The non-aqueous electrolyte includes a non-aqueous solvent and an electrolyte salt dissolved in the non-aqueous solvent. As the non-aqueous solvent, esters, ethers, nitriles, amides, a mixed solvent of two or more thereof, and the like may be used, for example. The non-aqueous solvent may contain a halogen-substituted solvent in which at least a part of hydrogens in these solvents is substituted with a halogen atom such as fluorine. The non-aqueous electrolyte is not limited to a liquid electrolyte, and may be a solid electrolyte using a gel polymer or the like. As the electrolyte salt, a lithium salt such as $LiPF_6$ is used, for example.

Any of the positive electrode 11, negative electrode 12, and separator 13 constituting the electrode assembly 14 is a band-Shaped elongated body, and spirally wound to be alternatively stacked in a radial direction of the electrode assembly 14. To prevent precipitation of lithium, the negative electrode 12 is formed to be one size larger than the positive electrode 11. That is, negative electrode 12 is formed to be longer than positive electrode 11 in a longitudinal direction and width direction (short direction). Two separators 13 are formed to be one size larger than at least the positive electrode 11, and disposed to, for example, sandwich the positive electrode 11. The electrode assembly 14 has a positive electrode lead 20 connected to the positive electrode 11 by welding or the like and a negative electrode lead 21 connected to the negative electrode 12 by welding or the like.

Insulating plates 18 and 19 are disposed on the upper and lower sides of the electrode assembly 14, respectively. In the example illustrated in FIG. 1, the positive electrode lead 20 extends through a through hole in the insulating plate 18 toward a side of the sealing assembly 17, and the negative electrode lead 21 extends through an outside of the insulating plate 19 toward the bottom side of the exterior housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23, becomes a positive electrode terminal. The negative electrode lead 21 is connected to a bottom inner surface of the exterior housing can 16 by welding or the like, and the exterior housing can 16 becomes a negative electrode terminal.

A gasket 28 is provided between the exterior housing can 16 and the sealing assembly 17 to achieve sealability inside the battery. On the exterior housing can 16, a grooved part 22 in which a part of a side part thereof projects inside for supporting the sealing assembly 17 is framed. The grooved part 22 is preferably formed in a circular shape along a circumferential direction of the exterior housing can 16, and supports the sealing assembly 17 with the upper surface thereof. The sealing assembly 17 is fixed on the upper part of the exterior housing can 16 with the grooved part 22 and an end part of the opening of the exterior housing can 16 calked to the sealing assembly 17.

The sealing assembly 17 has a stacked structure of the internal terminal plate 23, a lower vent member 24, an insulating member 25, an upper vent member 26, and the cap 27 in this order from a side of the electrode assembly 14. Each member constituting the sealing assembly 17 has, for example, a disk shape or a ring shape, and each member except for the insulating member 25 is electrically connected each other. The lower vent member 24 and the upper vent member 26 are connected at each of central parts thereof, and the insulating member 25 is interposed between each of circumferential parts thereof. If an internal pressure of the battery increases due to abnormal heat generation, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through the cap 27 opening.

Hereinafter, the positive electrode 11, negative electrode 12, and separator 13 constituting the electrode assembly 14, particularly the positive electrode 11, will be described in detail.

[Positive Electrode]

The positive electrode 11 has a positive electrode core and a positive electrode mixture layer provided on a surface of the positive electrode core. For the positive electrode core, a foil of a metal stable within a potential range of the positive electrode 11, such as aluminum, a film in which such metal is disposed on a surface layer thereof, and the like may be used. The positive electrode mixture layer includes a positive electrode active material, a binder, and a conductive agent, and is preferably provided on both surfaces of the positive electrode core except for a portion to which the positive electrode lead 20 is connected. The positive electrode 11 may be produced by, for example applying a positive electrode mixture slurry including the positive electrode active material, the binder, the conductive agent, and the like on the surface of the positive electrode core, drying and subsequently compressing the applied film to form the positive electrode mixture layer on both surfaces of the positive electrode core.

The positive electrode mixture layer includes the positive electrode active material including a lithium-transition metal composite oxide represented by a general formula of $Li_aNi_bCo_{(1-b-c)}Al_cO_d$ ($0.9<a\leq1.2$, $0.88\leq b\leq0.96$, $0.04\leq c<0.12$, and $1.9\leq d\leq2.1$) and 0.1 to 1.0 mass % of lithium carbonate based on the mass of the positive electrode active material. The lithium-transition metal composite oxide is secondary particles formed by aggregation of primary particles, and 0.05 to 0.20 mol % of tungsten (W) is present on a surface of the primary particles based on a total molar amount of metal elements excluding Li, in the positive electrode active material. Addition of 0.1 to 1.0 mass % of the lithium carbonate, based on the mass of the positive electrode active material in which 0.05 to 0.20 mol % of the W is adhered to the particle surface of the composite oxide, specifically increases the battery capacity.

The lithium-transition metal composite oxide is more preferably a composite oxide represented by a general formula of $Li_aNi_bCo_{(1-b-c)}Al_cO_d$ (0.9<a≤1.2, 0.88≤b≤0.92, 0.04≤c<0.12, and 1.9≤d≤2.1), and particularly preferably a composite oxide represented by a general formula of $Li_aNi_bCo_{(1-b-c)}Al_cO_d$ (0.9<a≤1.2, 0.91≤b≤0.92, 0.04≤c≤0.06, and 1.9≤d≤2.1).

In other words, a Ni content in the lithium-transition metal composite oxide is 88 to 96 mol %, preferably 88 to 92 mol %, and more preferably 91 to 92 mol % based on a total molar amount of metal elements excluding Li. An Al content in the lithium-transition metal composite oxide is 4 to 12 mol %, and preferably 4 to 6 mol % based on a total molar amount of metal elements excluding Li. When the Ni content is less than 88 mol %, the crystalline structure is originally stable, and thereby the effect of the present disclosure is difficult to appear. On the other hand, more than 96 mol % of the Ni content and necessarily less than 4 mol % of the Al content cannot sustain the stable crystalline structure, and the effect of increasing the capacity is not obtained.

The lithium-transition metal composite oxide may contain a metal element other than Li, Ni, Co, and Al, for example, Mn, B Mg, Ti, V, Cr, Fe, Cu, 7n, Ga, Si, Zr, Nb, Tn, Sn, Ta, W, Mo, and Ba, within a range in that an object of the present disclosure is not impaired.

The positive electrode active material is mainly composed of the lithium-transition metal composite oxide, and includes the W adhered on the surface of the primary particles of the composite oxide. Since the lithium-transition metal composite oxide is the secondary particles formed by aggregation of the primary particles, the W is adhered also on a surface of the secondary particles. More W may be present on the surface of the secondary particles than inside thereof. The positive electrode active material has a structure in which, for example, at least the surface of the secondary particles of the lithium-transition metal composite oxide is dotted with a W-containing compound.

Examples of the W-containing compound include tungsten oxide, lithium tungstate sodium tungstate, magnesium tungstate potassium tungstate, silver tungstate, tungsten boride, tungsten carbide, tungsten silicide, tungsten sulfide, and tungsten chloride. Among them, tungsten oxide ($WO_3$) is preferable. The W-containing compound may be used in combinations of two or more compounds.

A W content in the positive electrode active material is, in terms of W, 0.05 to 0.20 mol %, preferably 0.06 to 0.19 mol %, and more preferably 0.07 to 0.18 mol % based on a total molar amount of metal elements excluding Li. When the W content is less than 0.05 mol % or more than 0.20 mol %, the effect of increase in the capacity is not obtained. The content of each element in the positive electrode active material is measured by ICP emission spectrometric analysis.

The positive electrode active material may be produced by adding a powder of W or W-containing compound to a powder of the lithium-transition metal composite oxide to be mixed, and subsequently performing heat treatment at a temperature of 100° C. to 300° C. The heat treatment yields the positive electrode active material in which the W or W-containing compound is adhered to the surface of the primary particles of the lithium-transition metal composite oxide. Each of the powders may be mixed in a state of a dispersion liquid or solution before the heat treatment.

A median diameter (D50) on a volumetric basis of the positive electrode active material is, for example, 5 μm to 30 μm, and preferably 10 μm to 20 μm. The D50 on a volumetric basis, also referred to as an intermediate diameter, means a particle diameter at which a cumulative frequency is 50% from a smaller particle diameter side in a particle size distribution on a volumetric basis. The D50 may be measured by using a laser diffraction-type particle size distribution measuring device (for example, MICROTRAC HRA, manufactured by NIKKISO CO., LTD.) with water as a dispersion medium.

As mentioned above, the lithium carbonate ($Li_2CO_3$) is added to the positive electrode mixture layer in an amount of 0.1 to 1.0 mass % based on the mass of the positive electrode active material. If the battery is overcharged, the lithium carbonate is decomposed to generate carbon dioxide gas for triggering a current-cutting mechanism to prevent proceeding of the overcharging. In addition, the lithium carbonate contributes to increase the capacity by the interaction with the W. When the content of the lithium carbonate is less than 0.1 mass % or more than 1.0 mass %, the effect of increasing the capacity is not obtained. When the content of the lithium carbonate is more than 1.0 mass %, the gas is likely to be generated during a storage at high temperature. The content of the lithium carbonate is preferably 0.1 to 0.8 mass %, and more preferably 0.2 to 0.6 mass % based on the mass of the positive electrode active material.

In the positive electrode mixture layer, the lithium carbonate is present, for example, on the particle surface of the positive electrode active material (the surface of the secondary particles) and in a space among the positive electrode active materials. The lithium carbonate is preferably present near the positive electrode active material, and may be adhered to the particle surface of the positive electrode active material without the binder, and may be adhered to the particle surface with the binder interposed therebetween. 50 mass % or more of the lithium carbonate included in the positive electrode mixture layer preferably adheres to the particle surface of the positive electrode active material.

A D50 on a volumetric basis of the lithium carbonate is preferably, but not particularly limited to, 2 μm or more and is smaller than a D50 on a volumetric basis of the positive electrode active material. A lithium carbonate having too small a particle diameter requires an increased number of the particles and makes the BET specific surface area higher, resulting in adhesion of more binder to the lithium carbonate. As a result, an adhesiveness among constituting materials of the positive electrode mixture layer and an adhesiveness between the positive electrode mixture layer and the positive electrode core may be insufficient. The D50 on a volumetric basis of the lithium carbonate is preferably 2 μm to 1 μm, and more preferably 2 μm to 6 μm.

The lithium carbonate is added to the positive electrode mixture layer by, for example, adding the lithium carbonate to the positive electrode mixture shiny together with the positive electrode active material, the binder, and the conductive agent, and applying this positive electrode mixture slurry on the positive electrode core. A powder of the lithium carbonate may be added to and mixed with a powder of the positive electrode active material, and then the positive electrode mixture slurry may be prepared using this mixed powder.

Examples of the binder included in the positive electrode mixture layer may include fluororesin such as polytetrafluoroethylene (PTFE) and polyvinylidene fluoride (PVdF), polyacrylonitrile (PAN), a polyimide, an acrylic resin, and a polyolefin. With these resins, a cellulose derivative such as carboxymethyl cellulose (CMC) or a salt thereof, polyethylene oxide (PEO), and the like may be used in combination. A content of the binder is preferably, but not particularly limited to, 0.3 to 1.5 mass %, and more preferably 0.3 to 0.9 mass % based on a total mass of the positive electrode mixture layer.

Examples of the conductive agent included in the positive electrode mixture layer may include a carbon material such as carbon black, acetylene black, Ketjenblack, and graphite. A content of the conductive agent is preferably, but not particularly limited to, 0.1 to 1.5 mass %, and more preferably 0.3 to 1.2 mass % based on a total mass of the positive electrode mixture layer.

[Negative Electrode]

The negative electrode 12 has a negative electrode core and a negative electrode mixture layer provided on a surface of the negative electrode core. For the negative electrode core, a foil of a metal stable within a potential range of the negative electrode 12, such as copper, a film in which such metal is disposed on 8 surface layer thereof, and the like may be used. The negative electrode mixture layer includes negative electrode active material and a binder, and is preferably provided on, for example, both surfaces of the negative electrode core except for a portion to which the negative electrode lead 21 is connected. The negative electrode 12 may be produced by, for example, applying a negative electrode mixture slurry including the negative electrode active material, the binder, and the like on the surface of the negative electrode core, drying and subsequently compressing the applied film to form the negative electrode mixture layer on both surfaces of the negative electrode core.

The negative electrode mixture layer includes, for example, a carbon-based active material to reversibly occlude and release lithium ions, as the negative electrode active material. The carbon-based active material is preferably a graphite such as: a natural graphite such as flake graphite, lump graphite, and amorphous graphite; and an artificial graphite such as massive artificial graphite (MAG) and graphitized mesophase-carbon microbead (MCMB). For the negative electrode active material, a Si-based active material composed of at least one of Si and a Si-containing compound may also be used, and the carbon-based active material and the Si-based active material may be used in combination.

For the binder included in the negative electrode mixture layer, a fluororesin, PAN, a polyimide, an acrylic resin, a polyolefin, and the like may be used similar to that in the positive electrode 11, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR; and CMC or a salt thereof or PAA or a salt thereof; are preferably used in combination.

[Separator]

For the separator 13, a porous sheet having ion permeation property and insulation property is used. Specific examples of the porous sheet include a fine porous thin film, a woven fabric, and a nonwoven fabric. As a material of the separator 13, a polyolefin such as polyethylene and polypropylene, cellulose, and the like are preferable. The separator 13 may have any of a single-layered structure and a laminated structure. On a surface of the separator, a heat-resistant layer and the like may be formed.

EXAMPLES

Hereinafter, the present disclosure will be further described with Examples, but the present disclosure is not limited to these Examples.

Example 1

[Synthesis of Positive Electrode Active Material]

To a layer-structured lithium-transition metal composite oxide represented by a general formula of $LiNi_{0.91}Co_{0.03}Al_{0.06}O_2$, tungsten oxide ($WO_3$) was added to be mixed, and heat treatment was performed under a condition of oxygen atmosphere and at 200° C. to obtain a positive electrode active material in which the $WO_3$ was adhered to a particle surface of the lithium-transition metal composite oxide. An amount of the $WO_3$ added was 0.05 mol %, in terms of W, based on a total molar amount of metal elements excluding Li, in the positive electrode active material.

[Production of Positive Electrode]

The positive electrode active material, acetylene black, and polyvinylidene fluoride (PVdF) were mixed at a mass ratio of 100:1:0.9, further mixed with 0.3 mass % of lithium carbonate based on the mass of the positive electrode active material, and N-methyl-2-pyrrolidone (NMP) was used as a dispersion medium to prepare a positive electrode mixture layer. Then, this positive electrode mixture slurry was applied on both surfaces of a positive electrode core made of aluminum foil, the applied film was dried, compressed, and then cut to a predetermined electrode size to produce a positive electrode in which a positive electrode mixture layer was formed on both surfaces of the positive electrode core. An exposed part where a surface of the positive electrode core was exposed was provided, and a positive electrode lead was attached to the exposed part.

[Production of Negative Electrode]

As a negative electrode active material, a mixture of a natural graphite and a Si-containing compound represented by $SiO_x$ in which Si fine particles were dispersed in a $SiO_2$ phase was used. The negative electrode active material, carboxymethyl cellulose (CMC), and styrene-butadiene rubber (SBR) were mixed at a mass ratio of 95:3:2, and water was used as a dispersion medium to prepare a negative electrode mixture slimy. Then, the negative electrode mixture slimy was applied on both surfaces of a negative electrode core made of copper foil, the applied film was dried, compressed, and then cut to a predetermined electrode size to produce a negative electrode in which a negative electrode mixture layer was formed on both surfaces of the negative electrode core. An exposed part where a surface of the negative electrode core was exposed was provided, and a negative electrode lead was attached to the exposed part.

[Preparation of Non-Aqueous Electrolyte Liquid]

Into a mixed solvent of ethylene carbonate (EC) and methyl ethyl carbonate (MEC), $LrPF_6$ was dissolved at a concentration of 1 mol/L to prepare a non-aqueous electrolyte liquid.

[Production of Battery]

The positive electrode and the negative electrode were spirally wound with a separator made of polyethylene interposed therebetween to produce a flatly-formed wound-type electrode assembly. This electrode assembly and the non-aqueous electrolyte liquid were housed in a bottomed cylindrical exterior housing can, and a sealing assembly was attached to an opening of the exterior housing can to produce a cylindrical non aqueous electrolyte secondary battery.

Example 2

A positive electrode and a non-aqueous electrolyte secondary battery were produced in the same manner as in Example 1 except that the amount of the WO$_3$ added was 0.2 mol % in the synthesis of the positive electrode active material.

Example 3

A positive electrode and a non-aqueous electrolyte secondary battery were produced in the same manner as in Example 1 except that a composite oxide represented by a general formula of LiNi$_{0.91}$Co$_{0.05}$Al$_{0.04}$O$_2$ was used as the lithium-transition metal composite oxide.

Example 4

A positive electrode and a non-aqueous electrolyte secondary battery were produced in the same manner as in Example 3 except that the amount of the WO$_3$ added was 0.2 mol % in the synthesis of the positive electrode active material.

Example 5

A positive electrode and a non-aqueous electrolyte secondary battery were produced in the same manner as in Example 1 except that the amount of the lithium carbonate added was 0.1 mass % in the preparation of the positive electrode mixture slurry.

Comparative Example 1

A positive electrode and a non-aqueous electrolyte secondary battery were produced in the same manner as in Example 3 except that no WO$_3$ was added in the synthesis of the positive electrode active material and no lithium carbonate was added in the preparation of the positive electrode mixture slurry.

Comparative Example 2

A positive electrode and a non-aqueous electrolyte secondary battery were produced in the same manner as in Example 3 except that a composite oxide represented by a general formula of LiNi$_{0.91}$Co$_{0.055}$Al$_{0.035}$O$_2$ was used as the lithium-transition metal composite oxide.

Comparative Example 3

A positive electrode and a non-aqueous electrolyte secondary battery were produced in the same manner as in Example 3 except that no WO$_3$ was added in the synthesis of the positive electrode active material.

Comparative Example 4

A positive electrode and a non-aqueous electrolyte secondary battery were produced in the same manner as in Example 3 except that the amount of the WO$_3$ added was 0.3 mol % in the synthesis of the positive electrode active material.

Comparative Example 5

A positive electrode and a non-aqueous electrolyte secondary battery were produced in the same manner as Example 3 except that no lithium carbonate was added in the preparation of the positive electrode mixture slurry.

[Evaluation of Battery Capacity]

Each of the batteries of Examples and Comparative Examples was charged at 25° C. and with a constant current at 0.3 C until a battery voltage reached 4:2 V. and then charged with a constant voltage of 4.2 V until a current value reached 0.02 C. After the charging, the battery was discharged with a constant current at 0.3 C until a battery voltage reached 2.5 V. Then, a discharge capacity was determined, and a percent change in the capacity (relative value) of each battery, based on the discharge capacity of the battery of Comparative Example 1, was calculated. The evaluation results are shown in Table 1 with constitutions of the positive electrode mixture layers. As described later, a percent change in the capacity of each battery of Examples 6 and 7 was calculated based on the battery of Comparative Example 6, a percent change in the capacity of each battery of Examples 8 and 9 was calculated based on the battery of Comparative Example 7, and a percent change in the capacity of each battery of Comparative Examples 8 and 9 was calculated based on the battery of Comparative Example 10.

TABLE 1

| | Content of Metal Element (mol %) | | | | Amount of Li$_2$CO$_3$ Added (wt %) | Percent Change in Capacity (%) |
|---|---|---|---|---|---|---|
| | Ni/(Ni + Co + Al) | Co/(Ni + Co + Al) | Al/(Ni + Co + Al) | W/(Ni + Co + Al + W) | | |
| Example 1 | 91 | 3 | 6 | 0.05 | 0.3 | 1.2 |
| Example 2 | 91 | 3 | 6 | 0.2 | 0.3 | 1.4 |
| Example 3 | 91 | 5 | 4 | 0.05 | 0.3 | 1.1 |
| Example 4 | 91 | 5 | 4 | 0.2 | 0.3 | 0.9 |
| Example 5 | 91 | 5 | 4 | 0.05 | 0.1 | 1.1 |
| Comparative Example 1 | 91 | 5 | 4 | 0 | 0 | 0 |
| Comparative Example 2 | 91 | 5.5 | 3.5 | 0.05 | 0.3 | 0 |
| Comparative Example 3 | 91 | 5 | 4 | 0 | 0.3 | −0.1 |
| Comparative Example 4 | 91 | 5 | 4 | 0.3 | 0.3 | −0.2 |
| Comparative Example 5 | 91 | 5 | 4 | 0.05 | 0 | −0.2 |

As shown in Table 1, any battery of Examples was confirmed to have a larger capacity than the batteries of Comparative Examples. When the W is absent on the particle surface of the lithium-transition metal composite oxide (Comparative Example 3) and when the lithium-carbonate is absent in the positive electrode mixture layer (Comparative Example 5), the effect of increase in the capacity is not obtained. When the Al content is 3.5 mol % (Comparative Example 2) and when the amount of W added is 0.3 mol %, the effect of increasing the capacity also is not obtained. In other words, the battery capacity specifically increases only when 0.1 to 1.0 mass % of the lithium carbonate is added based on the mass of the positive electrode active material in which 0.05 to 0.20 mol % of the W is adhered to the particle surface of the lithium-transition metal composite oxide represented by a general formula of $Li_aNi_bCo_{(1-b-c)}Al_cO_d$ ($0.9 < a \leq 1.2$, $0.88 \leq b \leq 0.96$, $0.04 \leq c < 0.12$, and $1.9 \leq d \leq 2.1$).

Example 6

A positive electrode and a non-aqueous electrolyte secondary battery were produced in the same manner as in Example 1 except that a composite oxide represented by a general formula of $LiNi_{0.88}Co_{0.08}Al_{0.04}O_2$, was used as the lithium-transition metal composite oxide.

Example 7

A positive electrode and a non-aqueous electrolyte secondary battery were produced in the same manner as in Example 2 except that a composite oxide represented by a general formula of $LiNi_{0.88}Co_{0.08}Al_{0.04}O_2$ was used as the lithium-transition metal composite oxide.

Comparative Example 6

A positive electrode and a non-aqueous electrolyte secondary battery were produced in the same manner as in Example 6 except that no $WO_3$ was added in the synthesis of the positive electrode active material and no lithium carbonate was added in the preparation of the positive electrode mixture slurry.

TABLE 2

|  | Content of Metal Element (mol %) | | | | Amount of $Li_2CO_3$ Added (wt %) | Percent Change in Capacity (%) |
| --- | --- | --- | --- | --- | --- | --- |
|  | Ni/(Ni + Co + Al) | Co/(Ni + Co + Al) | Al/(Ni + Co + Al) | W/(Ni + Co + Al + W) | | |
| Example 6 | 88 | 8 | 4 | 0.05 | 0.3 | 0.8 |
| Example 7 | 88 | 8 | 4 | 0.2 | 0.3 | 0.7 |
| Comparative Example 6 | 88 | 8 | 4 | 0 | 0 | 0 |

As shown in Table 2, each battery of Examples 6 and 7 was confirmed to have a larger capacity than the battery of Comparative Example 6.

Example 8

A positive electrode and a non-aqueous electrolyte secondary battery were produced in the same manner as in Example 1 except that a composite oxide represented by a general formula of $LiNi_{0.92}Co_{0.04}Al_{0.04}O_2$ was used as the lithium-transition metal composite oxide.

Example 9

A positive electrode and a non-aqueous electrolyte secondary battery were produced in the same manner as Example 2 except that a composite oxide represented by a general formula of $LiNi_{0.92}Co_{0.04}Al_{0.04}O_2$ was used as the lithium-transition metal composite oxide.

Comparative Example 7

A positive electrode and a non-aqueous electrolyte secondary battery were produced in the same manner as in Example 8 except that no $WO_3$ was added in the synthesis of the positive electrode active material and no lithium carbonate was added in the preparation of the positive electrode mixture slurry.

TABLE 3

| | Content of Metal Element (mol %) | | | | Amount of $Li_2CO_3$ Added (wt %) | Percent Change in Capacity (%) |
|---|---|---|---|---|---|---|
| | Ni/(Ni + Co + Al) | Co/(Ni + Co + Al) | Al/(Ni + Co + Al) | W/(Ni + Co + Al + W) | | |
| Example 8 | 92 | 4 | 4 | 0.05 | 0.3 | 1.1 |
| Example 9 | 92 | 4 | 4 | 0.2 | 0.3 | 1.1 |
| Comparative Example 7 | 92 | 4 | 4 | 0 | 0 | 0 |

As shown in Table 3, each battery of Examples 8 and 9 was confirmed to have a larger capacity than the battery of Comparative Example 7. From the results shown in Tables 1 to 3, a higher Ni content was confirmed to raise the increasing percentage of the capacity. It is presumed that this is because a higher Ni content makes the crystalline structure of the lithium-transition metal composite oxide less stable to exhibit the effect of the present disclosure more significantly.

Comparative Example 8

A positive electrode and a non-aqueous electrolyte secondary battery were produced in the same manner as in Example 1 except that a composite oxide represented by a general formula of $LiNi_{0.82}Co_{0.14}Al_{0.04}O_2$ was used as the lithium-transition metal composite oxide.

Comparative Example 9

A positive electrode and a non-aqueous electrolyte secondary battery were produced in the same manner as in Example 2 except that a composite oxide represented by a general formula of $LiNi_{0.82}Co_{0.14}Al_{0.04}O_2$ was used as the lithium-transition metal composite oxide.

Comparative Example 10

A positive electrode and a non-aqueous electrolyte secondary battery were produced in the same manner as in Comparative Example 8 except that no $WO_3$ was added in the synthesis of the positive electrode active material and no lithium carbonate was added in the preparation of the positive electrode mixture slurry.

TABLE 4

| | Content of Metal Element (mol %) | | | | Amount of $Li_2CO_3$ Added (wt %) | Percent Change in Capacity (%) |
|---|---|---|---|---|---|---|
| | Ni/(Ni + Co + Al) | Co/(Ni + Co + Al) | Al/(Ni + Co + Al) | W/(Ni + Co + Al + W) | | |
| Comparative Example 8 | 82 | 14 | 4 | 0.05 | 0.3 | −0.1 |
| Comparative Example 9 | 82 | 14 | 4 | 0.2 | 0.3 | −0.2 |
| Comparative Example 10 | 82 | 14 | 4 | 0 | 0 | 0 |

As shown in Table 4, it was confirmed that the effect of increasing the capacity was not obtained when the Ni content is 82 mol %. In this case, the crystalline structure of the lithium-transition metal composite oxide is originally stable, and thereby the effect of the present disclosure seems difficult to appear.

REFERENCE SIGNS LIST

10 non-aqueous electrolyte secondary battery, 11 positive electrode, 12 negative electrode, 13 separator, 14 electrode assembly, 16 exterior housing can, 17 sealing assembly, 18, 19 insulating plate, 20 positive electrode lead, 21 negative electrode lead, 22 grooved part, internal terminal plate, 24 lower vent member, 25 insulating member, 26 upper vent member, 27 cap, 28 gasket

The invention claimed is:

1. A non-aqueous electrolyte secondary battery, comprising a positive electrode having a positive electrode core and a positive electrode mixture layer provided on a surface of the positive electrode core, wherein
the positive electrode mixture layer includes:
a positive electrode active material including a lithium-transition metal composite oxide represented by a general formula of $Li_aNi_bCo_{(1-b-c)}Al_cO_d$, where $0.9<a\leq1.2$, $0.88\leq b\leq0.96$, $0.04\leq c<0.12$, and $1.9\leq d\leq2.1$; and
0.1 to 1.0 mass % of lithium carbonate based on a mass of the positive electrode active material, and wherein
the lithium-transition metal composite oxide is secondary particles formed by aggregation of primary particles;
0.05 to 0.20 mol % of tungsten is present on a surface of the primary particles based on a total molar amount of metal elements excluding Li, in the positive electrode active material; and
a median diameter of a volume-based particle size distribution of the lithium carbonate is 2 μm or more and is smaller than a median diameter of a volume-based particle size distribution of the positive electrode active material.

2. The non-aqueous electrolyte secondary battery according to claim 1, wherein the lithium-transition metal composite oxide is a composite oxide represented by a general formula of $Li_aNi_bCO_{(1-b-c)}Al_cO_d$, where $0.9<a\leq1.2$, $0.88\leq b\leq0.92$, $0.04\leq c\leq0.06$, and $1.9\leq d\leq2.1$.

3. The non-aqueous electrolyte secondary battery according to claim 1, wherein the lithium-transition metal composite oxide is a composite oxide represented by a general formula of $Li_aNi_bCO_{(1-b-c)}Al_cO_d$, where $0.9<a\leq1.2$, $0.91\leq b\leq0.92$, $0.04\leq c\leq0.06$, and $1.9\leq d\leq2.1$.

4. The non-aqueous electrolyte secondary battery according to claim 1, wherein in the positive electrode mixture layer, the lithium carbonate is present on a particle surface of the positive electrode active material and in a space among the positive electrode active materials.

5. The non-aqueous electrolyte secondary battery according to claim 1,
wherein a content of a binder included in the positive electrode mixture layer is 0.3 to 0.9 mass % based on a total mass of the positive electrode mixture layer.

6. The non-aqueous electrolyte secondary battery according to claim 1, wherein the median diameter of the volume-based particle size distribution of the lithium carbonate is 2 μm or more and 12 μm or less.

* * * * *